(12) United States Patent
Landers et al.

(10) Patent No.: US 9,071,485 B2
(45) Date of Patent: Jun. 30, 2015

(54) REMOTE INTERACTION WITH ELECTRONIC DEVICES

(71) Applicant: International Business Machines Corporation, Armonk, NY (US)

(72) Inventors: Michael Landers, Cork (IE); Kevin McConnell, Austin, TX (US); Declan McNamara, Cork (IE); Gregg A. Smith, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/670,886

(22) Filed: Nov. 7, 2012

(65) Prior Publication Data

US 2014/0129663 A1     May 8, 2014

(51) Int. Cl.
*H04L 29/08* (2006.01)
*H04L 12/28* (2006.01)
*H04L 29/06* (2006.01)

(52) U.S. Cl.
CPC ............ *H04L 29/08* (2013.01); *H04L 12/2814* (2013.01); *H04L 29/06414* (2013.01)

(58) Field of Classification Search
CPC ........................ H04L 12/2807–12/2814; H04L 29/06414–29/06435

USPC ................................ 709/204–206, 223–229; 348/14.01–14.03

See application file for complete search history.

(56) References Cited

U.S. PATENT DOCUMENTS

| 7,536,034 | B2 | 5/2009 | Rhoads et al. |
| 7,870,228 | B2 | 1/2011 | Chiu et al. |
| 7,986,961 | B2 | 7/2011 | Gasborro et al. |
| 2010/0238194 | A1 | 9/2010 | Roach, Jr. |
| 2010/0257596 | A1* | 10/2010 | Ngo et al. .................. 726/7 |
| 2011/0319056 | A1 | 12/2011 | Toy et al. |
| 2012/0005390 | A1* | 1/2012 | Hoang .................... 710/311 |

OTHER PUBLICATIONS

"API" Newton's Telecom Dictionary, 21st ed., Mar. 2005.*

* cited by examiner

*Primary Examiner* — Brendan Higa
(74) *Attorney, Agent, or Firm* — Mark Vallone; Keohane & D'Alessandro PLLC; Hunter E. Webb (57) ABSTRACT

An approach for providing remote interaction (e.g., technical support) with electronic devices (e.g., mobile devices such as mobile phones, tablets, laptops, etc.) is provided. Specifically, remote control of a first electronic device may be obtained by an administrator device or the like. The first electronic device may then be remotely operated by the administrator device to view, indicate, and/or perform features/functions of a second electronic device needing technical support.

19 Claims, 6 Drawing Sheets

REMOTE INTERACTION WITH ELECTRONIC DEVICES

TECHNICAL FIELD

Aspects of the present invention relate to electronic device (e.g., mobile device) troubleshooting. Specifically, aspects of the present invention relate to the remote interaction (e.g., viewing, operating, etc.) of electronic devices for troubleshooting, or the like.

BACKGROUND

As the pervasiveness and capabilities of mobile devices continue to grow, greater levels of functionality are being provided in mobile devices. A user of a smart phone, a tablet, or the like, can now perform many functions that previously were limited to higher-level computer systems (e.g., laptops, desktops, etc.). For example, today a mobile device user may participate in video conferences, update social networking data, use multimedia applications, etc., all from his/her mobile device.

SUMMARY

In general, embodiments of the present invention relate to an approach for providing remote interaction (e.g., technical support) with electronic devices (e.g., mobile phones, tablets, laptops, desktop computers, etc.). Specifically, remote control of a first electronic device may be obtained via an "administrator device" or the like. The first electronic device may then be remotely operated by the administrator device to view, indicate, and/or perform features/functions of a second electronic device (e.g., "target device") needing technical support. For example, a camera function of the first electronic device may be utilized to view the second electronic device. Moreover, lighting functions of the first electronic device may be used to indicate certain components or functions of the second electronic device (e.g., via illumination) as well as a type of action to be performed (e.g., via flashing the light a certain number of times). Still yet, an input device (e.g., a keyboard) of the first electronic device may also be electronically paired with the second electronic device so that actions performed using the input device (e.g., remotely via the administrator device) may be automatically propagated to the second electronic device.

A first aspect of the present invention provides a computer-implemented method for providing remote interaction with electronic devices, the computer-implemented method comprising the steps of an administrator device establishing remote control of a first electronic device. The computer-implemented method further includes the administrator device controlling a set of functions of the first electronic device to interact with a second electronic device to be technically supported. The computer-implemented method further includes the administrator device indicating a set of actions to be performed on the second electronic device using the set of functions of the first electronic device.

A second aspect of the present invention provides a system for providing remote interaction with electronic devices, the system comprising a computer-readable storage device, at least one processor, and program instructions, stored on the computer-readable storage device for execution by the at least one processor. The program instructions include program instructions to establish remote control of a first electronic device; program instructions to control a set of functions of the first electronic device to interact with a second electronic device to be technically supported; and program instructions to indicate a set actions to be performed on the second electronic device using the set of functions of the first electronic device.

A third aspect of the present invention provides a computer program product for providing remote interaction with electronic devices, the computer program product comprising a computer-readable storage device and program instructions, stored on the computer-readable storage device for execution by at least one processor. The program instructions include program instructions to establish remote control of a first electronic device; program instructions to interact with a second electronic device to be technically supported via an administrator device; and program instructions to indicate a set actions to be performed on the second electronic device using the set of functions of the first electronic device.

A fourth aspect of the present invention provides a method for deploying a system for providing remote interaction with electronic devices, comprising: providing a computer infrastructure being operable to establish remote control of a first electronic device from an administrator device. The method further includes the computer infrastructure being further operable to control a set of functions of the first electronic device to interact with a second electronic device to be technically supported via the administrator device. The method further includes the computer infrastructure being further operable to indicate a set of actions to be performed on the second electronic device using the set of functions of the first electronic device.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention recognize that, unfortunately, the higher levels of functionality being provided in mobile devices often are accompanied with increased needs for technical support/troubleshooting. Specifically, more complex functionality and technology often result in more complex technical issues and/or instruction. Given the mobile nature of such devices, an administrator may not always be able to physically interact with a mobile device in need of troubleshooting. This problem may be compounded when mobile device operating systems fail to allow for remote technical support.

Embodiments of the present invention relate to an approach for providing remote interaction (e.g., technical support) with electronic devices (e.g., mobile phones, tablets, laptops, desktop computers, etc.). Specifically, remote control of a first electronic device may be obtained via an "administrator device" or the like. The first electronic device may then be remotely operated by the administrator device to view, indicate, and/or perform features/functions of a second electronic device (e.g., "target device") needing technical support. For example, the administrator device may utilize a camera function of the first electronic device to view the second electronic device. Moreover, the administrator device may utilize lighting functions of the first electronic device to indicate certain components or functions of the second electronic device (e.g., via illumination) as well as a type of action to be performed (e.g., via flashing the light a certain number of times). Still yet, an input device (e.g., a keyboard) of the first electronic device may also be electronically paired with the second electronic device so that actions performed using the input device (e.g., remotely via the administrator device) may be automatically propagated to the second electronic device.

Figure 1:
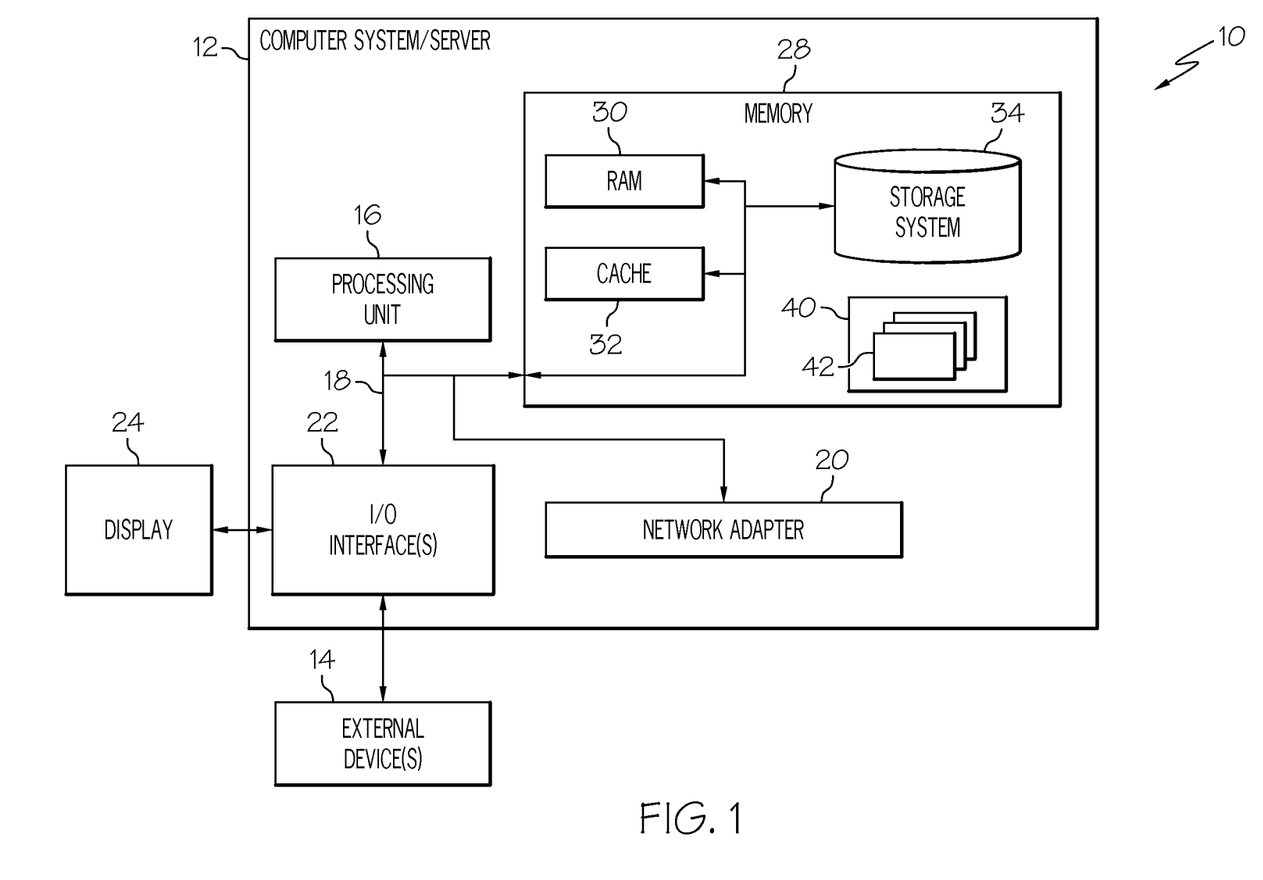
FIG. 1 depicts a computing node according to an embodiment of the present invention.

Referring now to FIG. 1, FIG. 1 depicts a computing node according to an embodiment of the present invention. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth herein.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin potential clients, thick potential clients, hand-held or laptop devices, mobile devices, global positioning systems (GPS), GPS-enabled devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media accessible by computer system/server 12, including both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each such media component can be connected to bus 18 by one or more data media interfaces. As will be further depicted and described below, memory 28 may include at least one program product having a set (e.g., at least one) of program modules that are configured with program instructions to carry out the functions of embodiments of the invention.

Program instructions embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42 with program instructions, may be stored in memory 28 by way of example, and not limitation. Memory 28 may also have an operating system, one or more application programs, other program modules, and program data. In general, program/utility 40 performs the function of the present invention as described herein. Each of the operating system, one or more application programs, other program modules, and program data or some combination thereof, may include an implementation of a networking environment. Program instructions of program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
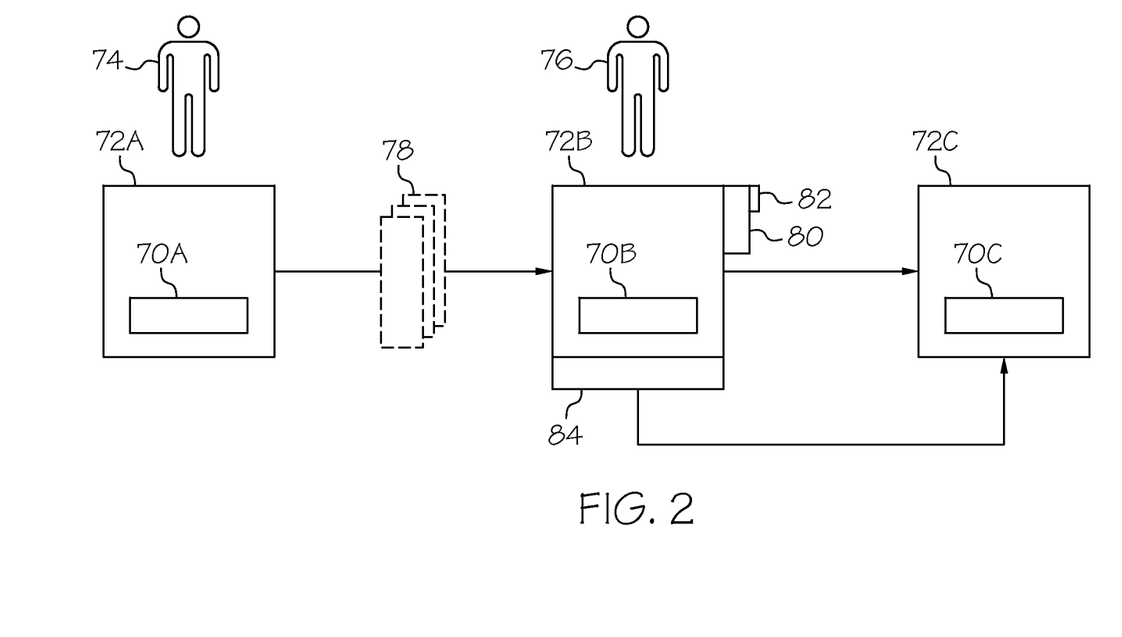
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of communication environment (e.g., a cellular network, a WiFi network, a cloud computing environment, etc.). Electronic devices/computer systems (devices 72A-C) interact with one another as shown. Under this embodiment, devices 72A-C are intended to represent any type of computing device capable of carrying out their respective functionality as described herein. In general, device 72A is intended to represent any type of computing device operated by an administrator 74 or the like (e.g., for troubleshooting other devices 72B-C). As further shown, each device 72A-C includes an application/program 70A-C which may include similar elements. In general, applications 70A-C and application programming interfaces (APIs) 78 enable the remote control of device 72B (e.g., an "operational device") from device 72A (e.g., an "administrator device") so that device 72C (e.g., a "target device") may be technically supported by administrator 74 in a remote fashion. Although not shown, it is understood that devices 72A-C typically include components (e.g., hardware and/or software) similar to computing node 10 of FIG. 1. Moreover, although shown as separate components loaded on each individual device 70A-C, it is understood that applications 72A-C could be implemented from a central server or the like (e.g., via a cloud environment. In such a case, each device 72A-C only needs to access its needed software components.

Regardless, using applications 70A-B and APIs 78, device 72A will obtain remote control of device 72B. Once remote control of device 72B has been obtained by device 72A, a set of functions of device 72B will be operated via device 72A to interact with device 72C. For example, using a camera function 80 of device 72B, device 72C may be physically viewed by administrator 74 via device 72A. Thereafter, another function (e.g., a lighting function 82) of device 72B may be utilized to indicate certain features or functions to be performed on device 72C. For example, light 82 may be directed to a particular location of device 72C to draw user 76's attention thereto. Alternatively, light 82 may be flashed according to a certain sequence to direct user 76 to perform certain actions with respect to device 72C (e.g., a certain flashing sequence may direct user 76 to "tap and hold" a certain location of a display of device 72C). Still yet, an input device such as a keyboard 84 associated with device 72B may also be electronically/logically "paired" (e.g., via Bluetooth and corresponding device driver software) with device 72C so that manipulations of keyboard 78 can be propagated to device 72C. Operation of keyboard 84 can be performed by administrator 74 (e.g., via device 72A) or user 76 (e.g., via device 72B) to provide support to device 72C.

In general, APIs 78 enable the interaction between applications 70A and 70B. That is, application 70A will call APIs 78 to control functions of device 72B via application 70B. Along these lines, APIs 78 may be embodied within device 72B, or in a network environment such as a cloud computing environment. In the case of the latter, APIs 78 may be leveraged from multiple devices to interface with other devices. It is further understood that each application 70A-C and APIs 78 will typically be embodied as a computer program product that is stored in computer memory of a computing device and is executable by a processor or processing unit (e.g., similar to program 40 stored in memory 28 and executable by processing unit 16 of computer system 12 of FIG. 1).

Illustrative Example

Figure 3:
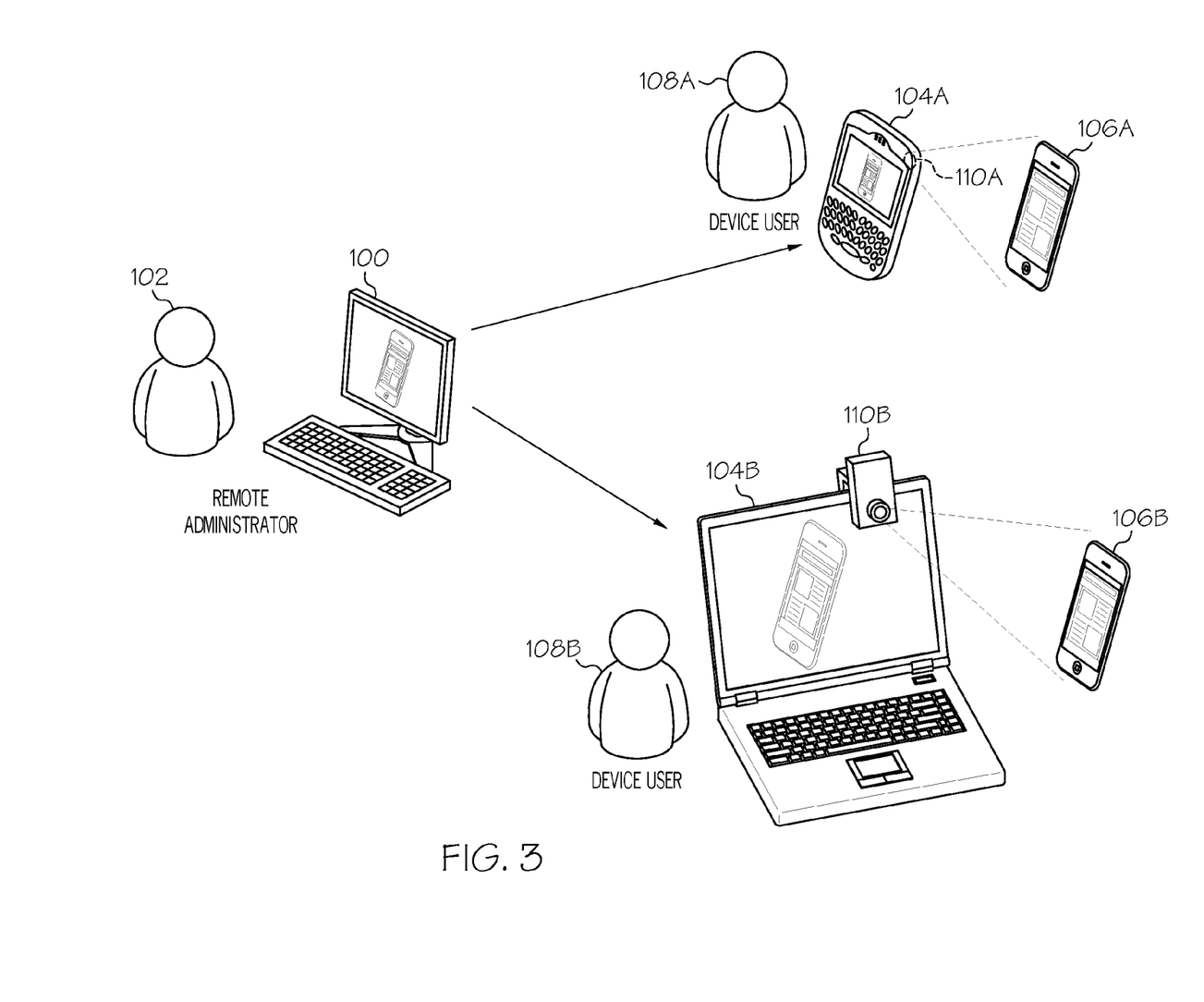
FIG. 3 depicts an illustrative usage scenario according to an embodiment of the present invention.

FIG. 3 depicts an illustrative usage scenario according to an embodiment of the present invention. As depicted in FIG. 3, administrator device 100 may be operated by administrator 102 to gain remote control of devices 104A-B to troubleshoot devices 106A-B (e.g., via users 108A-B). Cameras 110A-B on devices 104A-B may be utilized to gain a view of devices 106A-B by administrator 102 via device 100. Once administrator 102 can remotely view devices 106A-B, administrator 102 may then use administrator device 100 to remotely control devices 104A-B and/or to remotely instruct users 108A-B to troubleshoot/provide technical support to devices 106A-B. It is understood that the remote control of devices 104A-B is gained and utilized to interact with devices 106A-B via applications and/or APIs such as those shown in FIG. 2.

Figure 4:
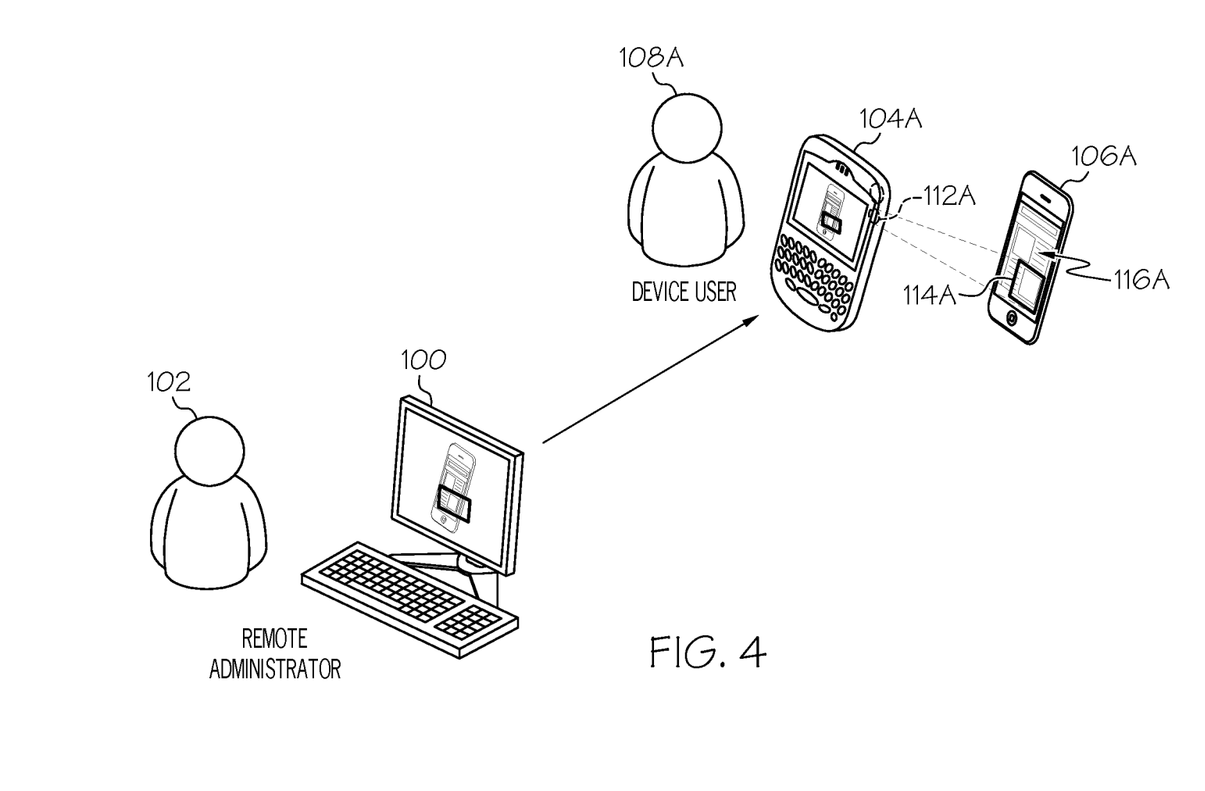
FIG. 4 depicts an example of remote operation of a device according to an embodiment of the present invention.

In any event, FIG. 4 depicts an example of remote operation of device 104A according to an embodiment of the present invention. As depicted, a light function 112A of device 104A is remotely utilized (e.g., by administrator 102 via device 100) to indicate a particular area 114A of display 116A of device 106A for which user 108A interaction is needed. Thus, light function 112A may be used as a "pointer" as shown. As indicated above, light function 112A may also be used to direct particular user 108A actions (e.g., via flashing sequences). For example, a single flash of light on location 114A could direct user 108A to tap location 114A of display 116A. A double flash of light could direct user 108A to tap and hold location 116A. Thus, certain flash sequences may be associated with certain actions to be performed by user 108A.

Figure 5:
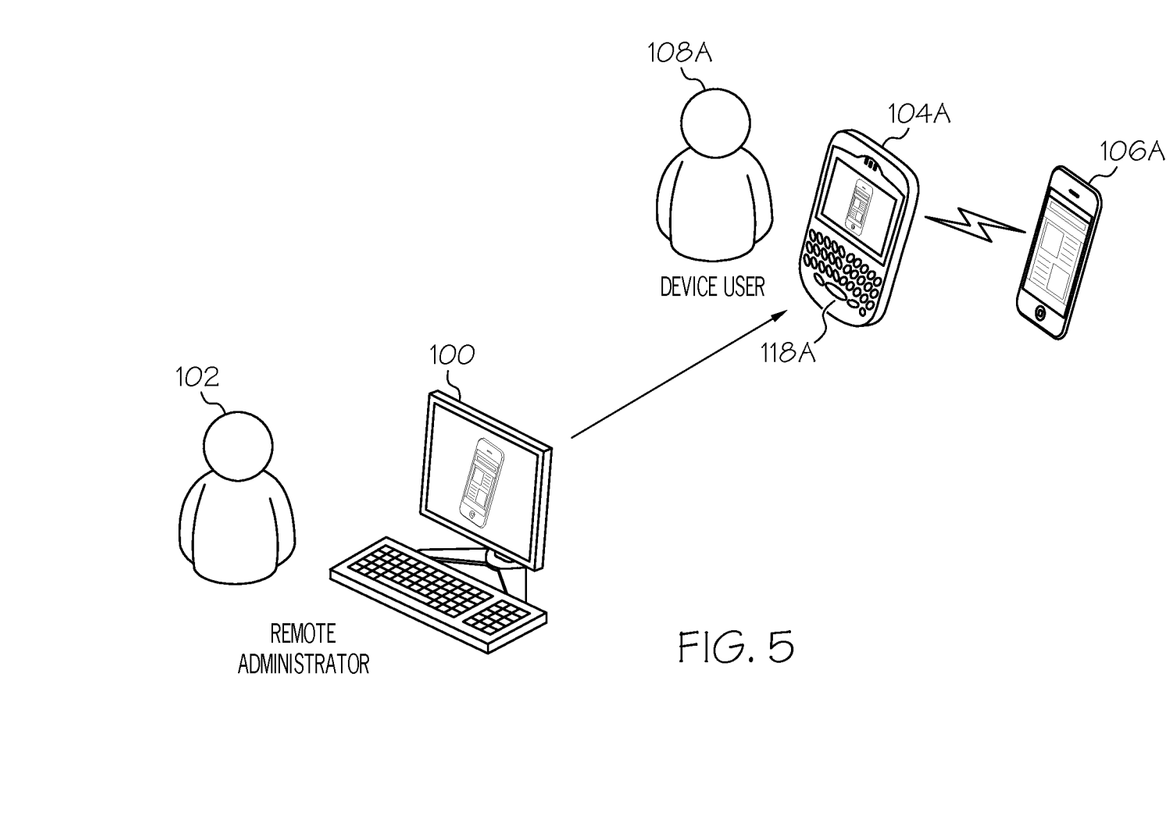
FIG. 5 depicts another example of remote operation of a device according to an embodiment of the present invention.

FIG. 5 depicts an additional example of remote operation of device 104A according to an embodiment of the present invention. In this example, keyboard 118A of device 104A has been electronically/logically paired with device 106A so that interactions with keyboard 118A may be used to control/operate device 106A. Such pairing may be facilitated remotely via device 100 once remote control of device 104A is obtained (e.g., via applications/APIs such as those shown in FIG. 2). Regardless, once keyboard 118A is paired with device 106A, administrator 102 may remotely use keyboard 118A to interact with device 106A. Alternatively, user 108A may control device 106A using keyboard 118A.

It is understood the camera and light functions are only two examples of functions of one device (an operational device) that could be remotely used to interact with (e.g., troubleshoot) another device (a target device) by an administrator device or the like. Along these lines, it is understood that any type of electronic device function now known or later developed could be leveraged in a similar fashion.

Figure 6:
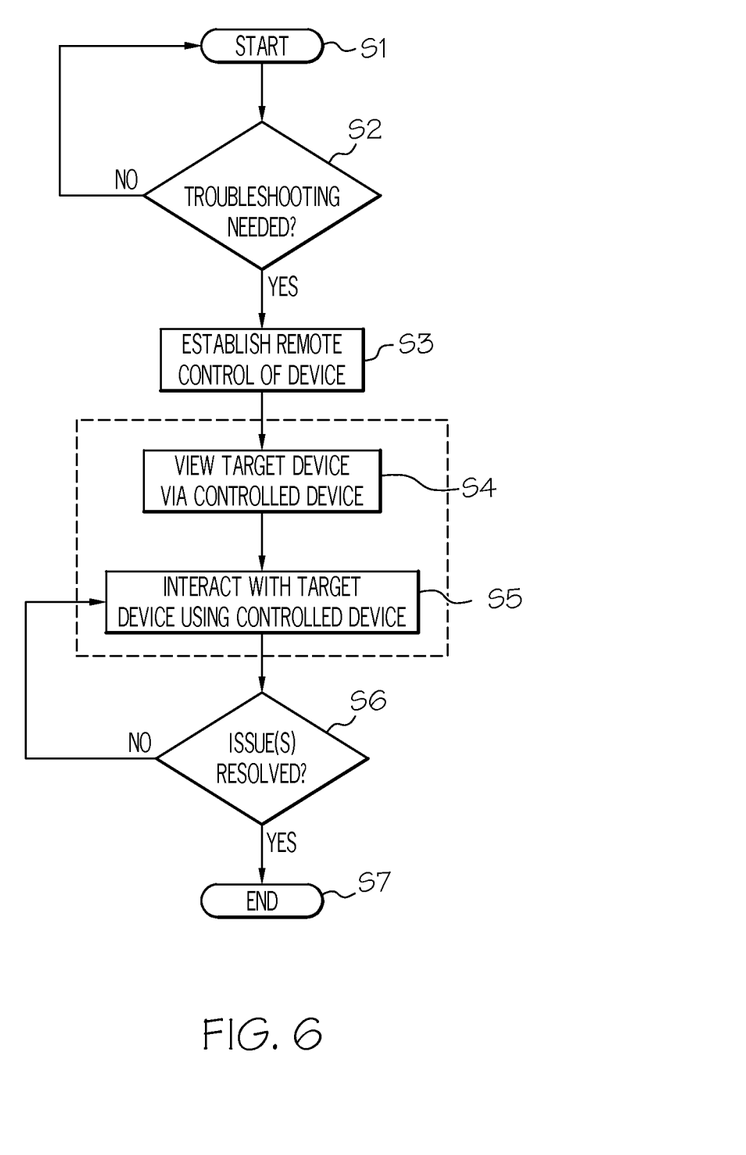
FIG. 6 depicts a method flow diagram according to an embodiment of the present invention.

Referring now to FIG. 6, a method flow diagram according to an embodiment of the present invention is shown. In general, it is understood that this method is typically performed and/or enabled by the applications 70A-C and APIs 78 shown in FIG. 2. As indicated above, each device 72A-C and corresponding application 70A-C may be represented similar to computer system 12 and program 40 of FIG. 1. Regardless, the process is started in step S1. In step S2, application 70C determines whether troubleshooting of target device (e.g., device 72C of FIG. 2) is needed (e.g., based upon error detection). If not, the process can return to step S1. If so, application 70A calls one or more of APIs 78 to utilize application 70B to establish remote control of an operational device (e.g., device 72B of FIG. 2) by an administrator device (e.g., device 72A of FIG. 2) in step S3. Thereafter, application 70A calls one or more of APIs 78 to utilize application 70B to control a set of functions of the operational device (from the administrator device) to interact with the target device (shown collectively in steps S4-S5). For example, in step S4, one or more of APIs 78 utilize application 70B to operate a camera function of the operational device so that the target device can be viewed from the administrator device (e.g., by an administrator). In step S5, one or more of APIs 78 utilize application 70B to interact with the target device via the operational (remote controlled) device. As indicated above, interaction with the target device can include utilization of various functions of the operational device such as the lighting function, the keyboard, etc. In step S6, application 70C determines if the issue needing troubleshooting has been resolved. If not, the process may return to step S5. If so, the process will be ended in step S7.

While shown and described herein as a remote device interaction/troubleshooting solution, it is understood that the invention further provides various alternative embodiments. For example, in one embodiment, the invention provides a computer-readable/useable medium that includes computer program code to enable a computer infrastructure to provide remote device interaction/troubleshooting as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide remote device interaction/troubleshooting functionality. In this case, the service provider can create, maintain, support, etc., a computer infrastructure, such as computer system/server 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for a remote device interaction/troubleshooting. In this case, a computer infrastructure, such as computer system 12/server (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for providing remote interaction with electronic devices, the computer-implemented method comprising the steps of:
   an administrator device establishing remote control of a first electronic device;
   the administrator device controlling a set of functions of the first electronic device to interact with a second electronic device to be technically supported;
   the administrator device indicating a set of actions to be performed on the second electronic device using the set of functions of the first electronic device; and
   the administrator device performing the set of actions on the second electronic device.

2. The computer-implemented method of claim 1, further comprising the administrator device remotely operating an input device paired with the first electronic device and the second electronic device to control the second electronic device.

3. The computer-implemented method of claim 1, the set of functions comprising a camera function, and the computer-implemented method further comprising the administrator device operating the camera function of the first electronic device to provide a view the second electronic device from the administrator device.

4. The computer-implemented method of claim 1, the set of functions comprising at least one light function, and the computer-implemented method further comprising the administrator device operating the at least one light function of the first electronic device to indicate a particular feature or function of the second electronic device.

5. The computer-implemented method of claim 1, at least one of the first electronic device and the second electronic device comprising a mobile device.

6. The computer-implemented method of claim 1, the administrator device establishing the control of the first electronic device via at least one application and at least one application programming interface (API).

7. A system for providing remote interaction with electronic devices, the system comprising a computer-readable storage device, at least one processor, and program instructions stored on the computer-readable storage device for execution by the at least one processor, the program instructions comprising:
   program instructions to establish remote control of a first electronic device;
   program instructions to control a set of functions of the first electronic device to interact with a second electronic device to be technically supported;
   program instructions to indicate a set of actions to be performed on the second electronic device using the set of functions of the first electronic device; and
   program instructions to perform the set of actions on the second electronic device.

8. The system of claim 7, further comprising program instructions, stored on the computer-readable storage device for execution by the at least one processor, to remotely operate an input device paired with first electronic device and the second electronic device to control the second electronic device.

9. The system of claim 7, the set of functions comprising a camera function, and the system further comprising program instructions, stored on the computer-readable storage device for execution by the at least one processor, to operate the camera function of the first electronic device to provide a view the second electronic device from an administrator device.

10. The system of claim 7, the set of functions comprising at least one light function, and the system further comprising program instructions, stored on the computer-readable storage device for execution by the at least one processor, to operate the at least one light function of the first electronic device to indicate a particular feature or function of the second electronic device.

11. The system of claim 7, at least one of the first electronic device and the second electronic device comprising a mobile device.

12. The system of claim 7, the system further comprising program instructions, stored on the computer-readable storage device for execution by the at least one processor, to establish control of the first electronic device via at least one application and at least one application programming interface (API).

13. A computer program product for providing remote interaction with electronic devices, the computer program product comprising a computer-readable storage device and program instructions, stored on the computer-readable storage device for execution by at least one processor, the program instructions comprising:
   program instructions to establish remote control of a first electronic device;
   program instructions to interact with a second electronic device to be technically supported via an administrator device;
   program instructions to indicate a set actions to be performed on the second electronic device using the set of functions of the first electronic device; and
   program instructions to perform the set of actions on the second electronic device.

14. The computer program product of claim 13, further comprising program instructions, stored on the computer-readable storage device for execution by at least one processor, to remotely operate an input device paired with first electronic device and the second electronic device to control the second electronic device.

15. The computer program product of claim 13, the set of functions comprising a camera function, and the computer program product further comprising program instructions, stored on the computer-readable storage device for execution by at least one processor, to operate the camera function of the first electronic device to provide a view the second electronic device from the administrator device.

16. The computer program product of claim 13, the set of functions comprising at least one light function, and the computer program product further comprising program instructions, stored on the computer-readable storage device for execution by at least one processor, to operate the at least one light function of the first electronic device to indicate a particular feature or function of the second electronic device.

17. The computer program product of claim 13, at least one of the first electronic device and the second electronic device comprising a mobile device.

18. The computer program product of claim 13, the computer program product further comprising program instructions, stored on the computer-readable storage device for execution by at least one processor, to establish control of the first electronic device via at least one application and at least one application programming interface (API).

19. A method for deploying a system for providing remote interaction with electronic devices, the computer program product comprising:
   providing a computer infrastructure being operable to:
      establish remote control of a first electronic device from an administrator device;

control a set of functions of the first electronic device to interact with a second electronic device to be technically supported via the administrator device;
indicate a set actions to be performed on the second electronic device using the set of functions of the first electronic device; and
perform, by the administrator device, the set of actions on the second electronic device.

* * * * *